United States Patent [19]

Guzikowski

[11] Patent Number: 5,306,564
[45] Date of Patent: Apr. 26, 1994

[54] MOLD CLOSURE SYSTEM

[75] Inventor: Gary R. Guzikowski, Franklin, Wis.

[73] Assignee: The Kelch Corporation, Cedarburg, Wis.

[21] Appl. No.: 16,347

[22] Filed: Feb. 11, 1993

[51] Int. Cl.⁵ .............................................. B29C 37/00
[52] U.S. Cl. ..................................... 425/408; 425/434; 425/450.1; 425/451.9
[58] Field of Search ............ 425/406, 408, 434, 450.1, 425/451.9

[56] References Cited

U.S. PATENT DOCUMENTS

| | | | |
|---|---|---|---|
| 978,726 | 12/1910 | Fox | 425/408 |
| 2,298,057 | 10/1942 | Kelm | 425/451.9 |
| 2,964,791 | 12/1960 | McFarland | 425/408 |
| 3,078,515 | 2/1963 | Wintriss | 425/450.1 |
| 3,157,914 | 11/1964 | Deibel et al. | 425/406 |
| 3,611,506 | 10/1971 | Schroeder | 425/450.1 |
| 4,143,587 | 3/1979 | Fujii | 425/408 |
| 4,931,007 | 6/1990 | Gold/dalg et al. | 425/438 |
| 5,044,925 | 9/1991 | Watanabe | 425/408 |
| 5,061,165 | 10/1991 | Guzikowski | 425/117 |

FOREIGN PATENT DOCUMENTS 407746   4/1974   U.S.S.R. ............... 425/450.1

Primary Examiner—Charles S. Bushey
Attorney, Agent, or Firm—Quarles & Brady

[57] ABSTRACT

There is disclosed a spring-loaded shock absorbing system for use with molding devices to minimize wear due to repeated closing of mold portions. A helical spring which separates the mold portions must be overcome to join the mold portions. The spring is compressed between a platform's shoulder surface of adjustable height and a ledge flaring outward from a spring retainer. The shock absorber is used in conjunction with a clamping system.

3 Claims, 3 Drawing Sheets

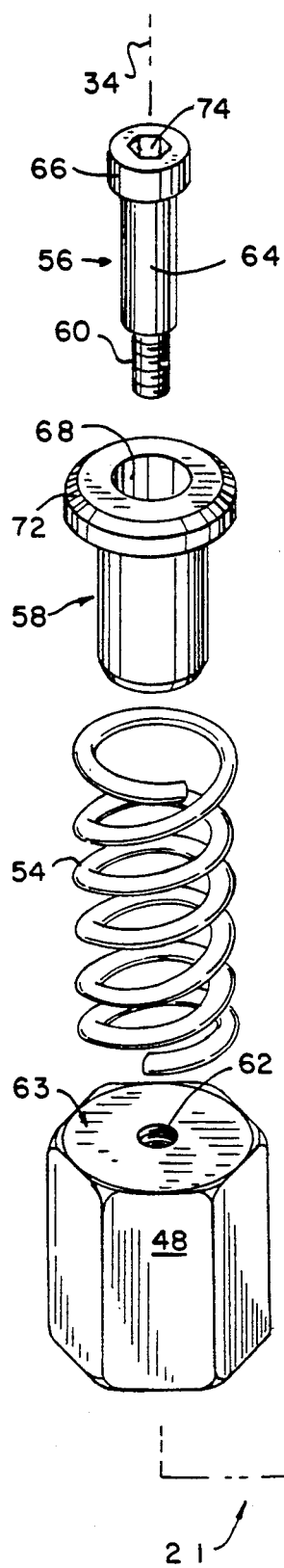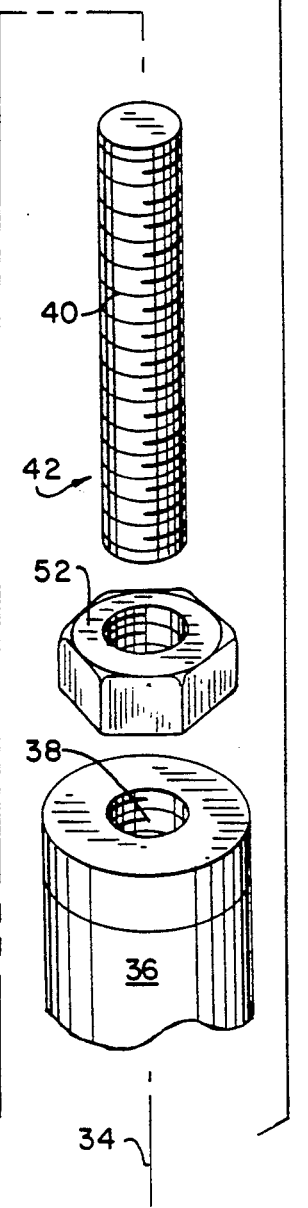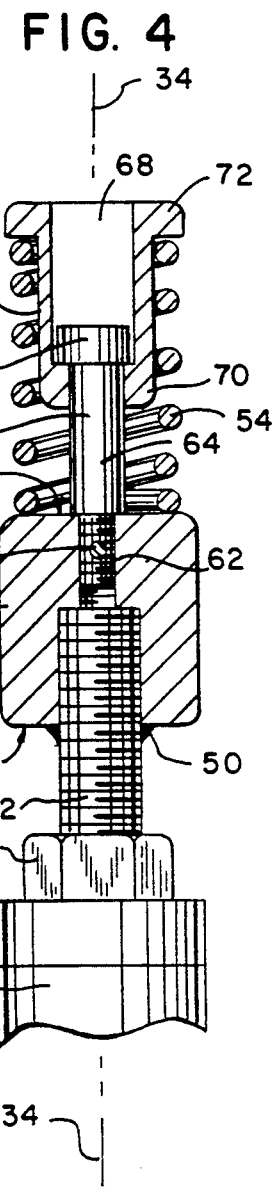

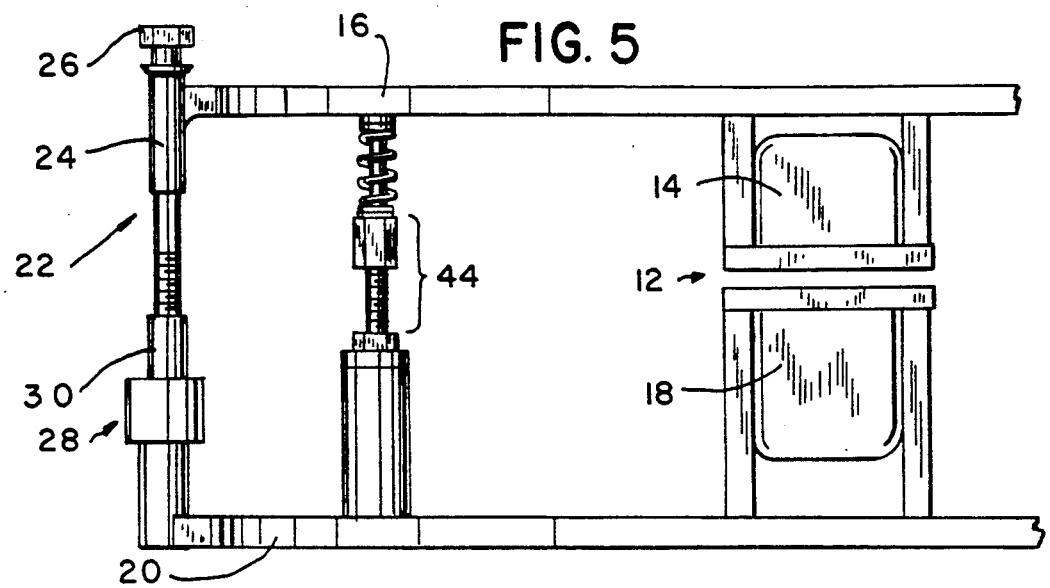
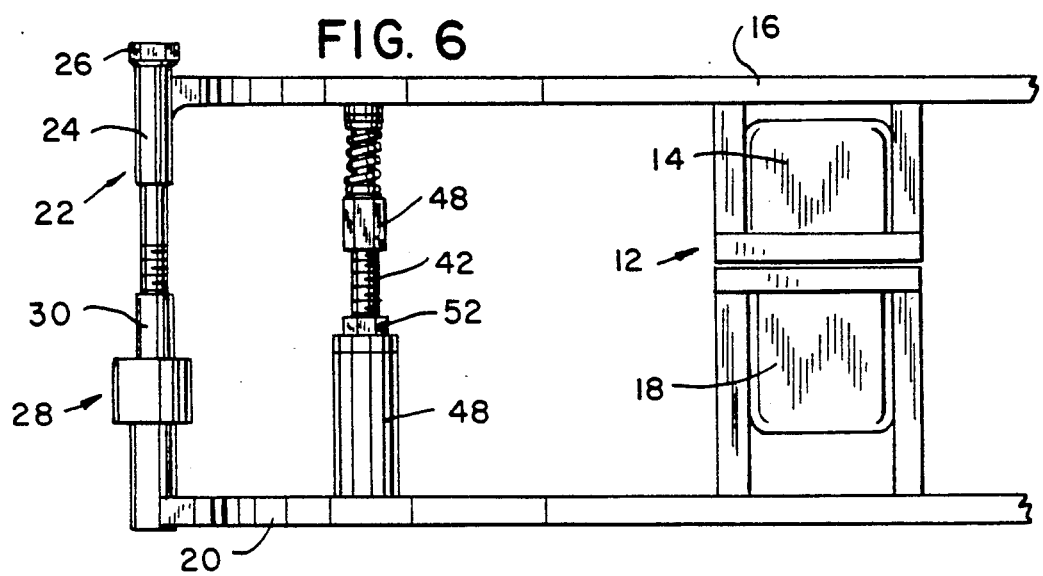
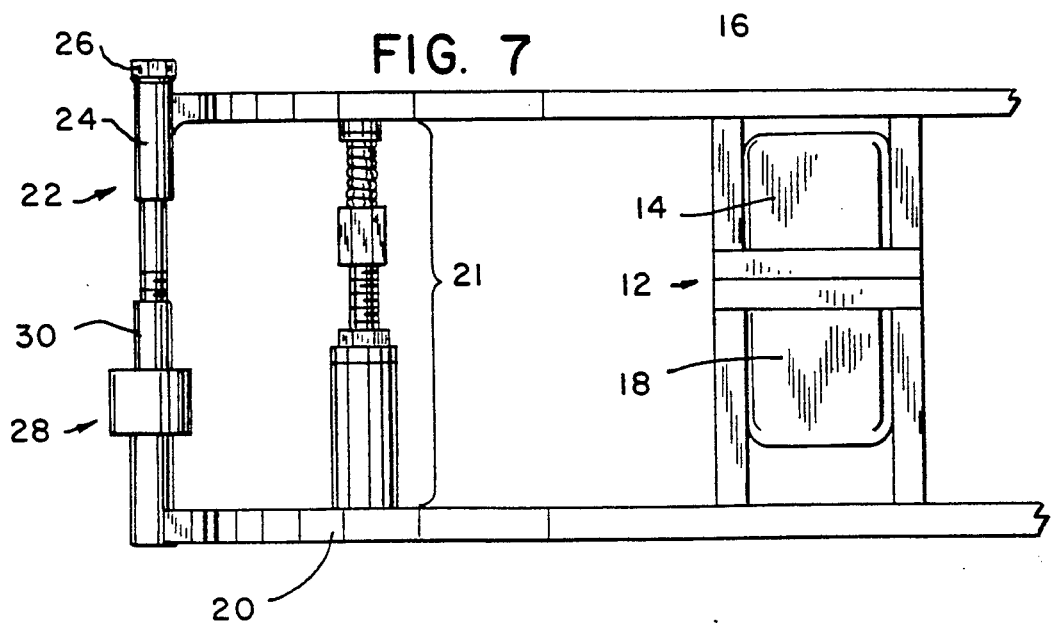

MOLD CLOSURE SYSTEM

FIELD OF THE INVENTION

This invention relates to molding devices and particularly to an apparatus for reducing wear and damage to mold halves as a result of repeated closings of the mold.

DESCRIPTION OF THE ART

In manufacturing articles in a molding process, two or more mold parts are brought together to form a mold cavity in which an article is cast. Repeated closures can cause damage at the parting line of the mold portions. As a result, the mold may leak, thereby causing imperfectly formed articles, difficulty in opening the mold, and/or wasted core material. There is therefore a need for a mold closure system that avoids these problems.

SUMMARY OF THE INVENTION

The invention provides a mold closure system of the type having at least two mold portions that can abut to form a seam. A resilient shock absorber having a resilient spring is linked to one of the mold portions and projects therefrom such that before the mold portions can abut to form the seam, the shock absorber will contact a surface linked to the second mold portion. The system also provides a clamp.

In one alternative form, the shock absorber and clamp are juxtaposed such that the mold portions will not form the seam until a clamping force is provided by the clamp to pull the mold portions together. Thus, if one mold half is on top of the other, gravity alone will not drive the halves into contact at the seam.

Preferably, a helical spring provides resiliency to the shock absorber and the spring is retained around a post between two flanges. To adjust for spring fatigue or for installation on different mold systems, the rest position of the second flange is made adjustable.

The objects of the invention include:

(a) providing an apparatus of the above kind to allow mold portions to be closed gently in order to minimize wear and damage;

(b) providing such an apparatus which is simple and cost effective; and (c) providing such an apparatus which can easily be adjusted to correct for spring fatigue and/or for use on different molding devices.

These and still other objects and advantages of the invention will be apparent from the description which follows. In the description, the preferred embodiments will be described with reference to the accompanying drawings. These embodiments do not represent the full scope of the invention. Rather, reference should be made to the claims herein for interpreting the full scope of the invention.

BRIEF DESCRIPTION OF THE DRAWINGS

FIG. 3 is an enlarged, exploded, perspective view of a mold closure system embodying the present invention;

FIG. 4 is a cross-sectional elevational view of the parts shown in FIG. 3 (albeit in assembled form); and FIGS. 5, 6 and 7 are enlarged partial elevational views showing stages in closing molds portions of the machine of FIG. 1.

DESCRIPTION OF THE PREFERRED EMBODIMENTS

Figure 1:
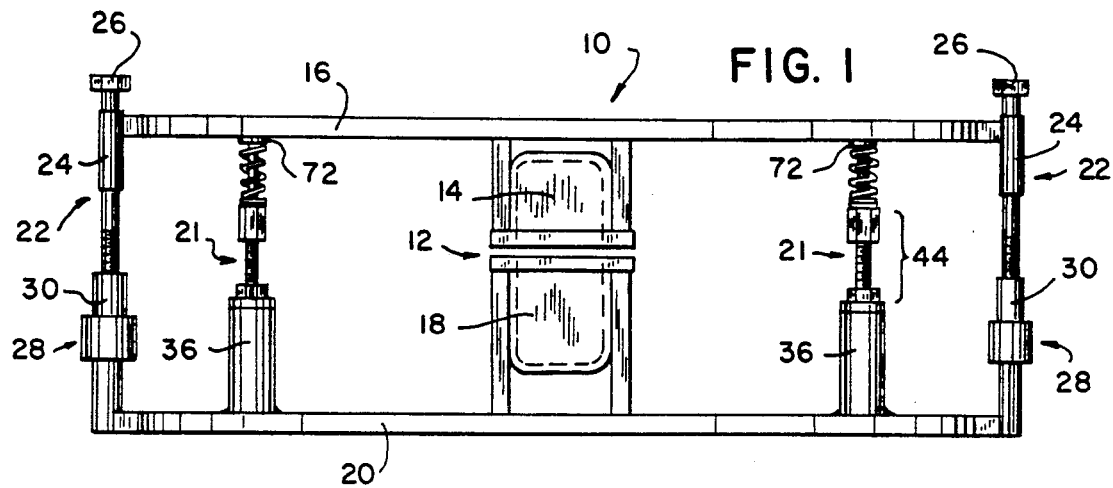
FIG. 1 is a front elevational view of a rotational molding machine embodying the present invention.
Figure 2:
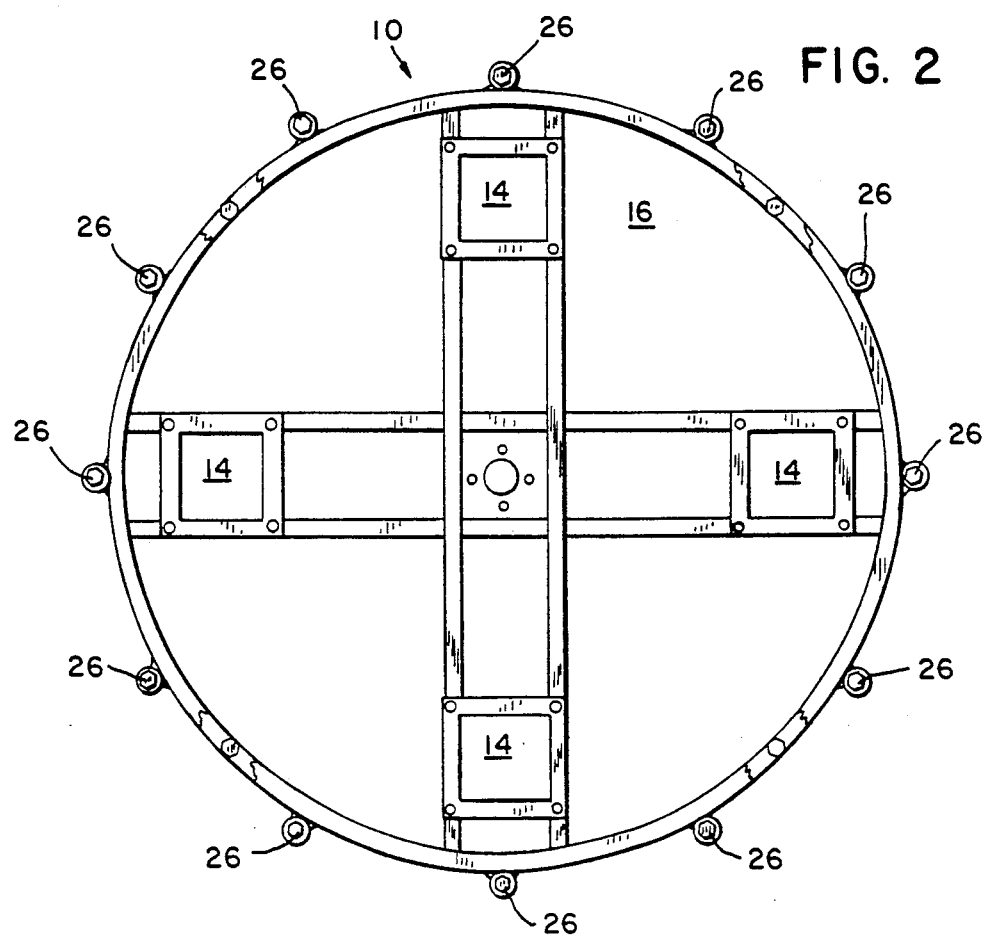
FIG. 2 is a top plan view of the machine of FIG. 1.

FIGS. 1 and 2 show a rotational molding apparatus 10 which has four mold units 12. Each upper mold half or portion 14 is located near the periphery of a circular top mounting frame 16. Each lower mold half or portion 18 is attached to a circular lower mounting frame 20. As seen in FIG. 1, the top mounting frame 16 is supported over the lower mounting frame 20 by four mold closure systems 21 (described hereafter) which are equidistantly spaced between the outer edges of the mounting frames 16, 20.

As seen in FIG. 2, located equidistantly on the radial periphery of top mounting frame 16 are twelve clamping bolt assemblies 22. Each consists of a hollow vertical sleeve 24 attached to the edge of top mounting frame 16 and a bolt 26 having a threaded end inserted downward through the sleeve.

Located equidistantly around the radial periphery of lower mounting frame 20 are twelve bolt receiving assemblies 28. Each consists of a vertical internally threaded tube 30 designed to threadably receive bolt 26. Clamping bolt assemblies 22 and bolt receiving assemblies 28 are positioned so that when they are vertically aligned, each upper mold portion 14 is positioned directly over a lower mold portion 18.

FIGS. 3 and 4 show the components and assembly of mold closure system 21 along a vertical longitudinal axis 34. The system 21 is preferably supported by a post-like base 36 which has a threaded longitudinal bore 38 opening at its top. Bore 38 accepts the bottom portion of threaded rod 40, which forms the foot 42 of a body assembly 44.

Body assembly 44 is formed by screwing the upper portion of threaded rod 40 into a threaded longitudinal bore in the bottom 46 of an elongated hexagonal body 48 and by welding rod 40 to bottom 46 at their junction 50. A locknut 52 may be used on foot 42 to set any adjustment made as described below.

A cushioning assembly comprises helical spring 54, post 56 and spring retainer 58. Post 56 has a narrow, lower threaded portion 60 (which can threadably mate with longitudinal bore 62 extending into the top, or shoulder surface 63, of hexagonal body 48), a wider central neck portion 64 and a still wider upper head portion 66. Spring retainer 58 is a hollow cylinder whose longitudinal internal bore has a wide upper portion 68 and a narrower lower portion which is defined by inwardly projecting bottom lip 70. Externally, the top of spring retainer 58 flares outward to form ledge 72.

In assembly, post 56 is dropped neck-first into bore 68 at the top of spring retainer 58 so that head 66 rests on lip 70. Spring 54 is slipped over spring retainer 58 so that the upper end of spring 54 abuts ledge 72. The lower end of spring 54 is placed on shoulder surface 63 of body 48, and post 56 is threaded into bore 62 in shoulder surface 63, thereby compressing spring 54 between ledge 72 and shoulder surface 63. A socket, such as hexagonal socket 74, may be formed in the top of post 56 to permit the use of a wrench in inserting post 56 into body 48. To immobilize post 56, set screw 75 can be tightened against threaded portion 60 of post 56 through a side wall of body 48.

After assembly, spring retainer 58 can slidably move up and down neck 64. However, the interference of head 66 and lip 70 prevents the removal of spring retainer 58.

The height of spring retainer 58 may be adjusted by rotating body 48 around its longitudinal axis which causes foot 42 threadably to move into or be withdrawn from base 36, depending on the direction of rotation.

To operate the rotational molding machine 10, top mounting frame 16 is placed upon ledges 72 of the closure systems 21. As best seen in FIG. 5, upper and lower mold portions 14, 18 are initially kept apart by the mold closure systems 21 (notwithstanding the effect of gravity). The twelve clamping bolt assemblies 22 are aligned over the twelve bolt receiving assemblies 28, and bolts 26 are inserted into tubes 30.

As best shown in FIGS. 6 and 7, as bolts 26 are tightened, top mounting frame 16 and the upper portion 14 of the molds 12 are lowered, thereby further compressing spring 54 between ledge 72 of spring retainer 58 and shoulder surface 63 of body 48. The force exerted by spring 54 is in opposition to the downward force exerted by bolts 26. The offsetting, cushioning force exerted by springs 54 allows the upper mold portions 14 to be gently adjoined to lower mold portions 18 as shown in FIG. 7.

After closure of molds 12, they are filled with material to be molded, and the mounting frames 16, 20 are rotated about their central axis as in a conventional rotational molding process. Spring 54 is preferably chosen, and the height of spring retainer 58 is adjusted, so that when top mounting frame 16 is placed on the four mold closure assemblies upper mold portions 16 will be separated from lower mold portions 18 and the ends of bolts 26 of clamping bolt assemblies 22 will extend slightly into tubes 30 of bolt receiving assemblies 28.

Although a preferred embodiment of the invention has been descried above, the invention claimed is not so restricted. For example, the apparatus could be arranged so that the spring is suspended above the top mounting frame and therefore the spring extends as the top mounting frame is lowered. Moreover, non-spring means for exerting a similar cushioning force may be used. Further, the invention is not restricted for use in rotational molding machines. It may be used in injection molding devices and in machines employing other molding methods. Thus, the invention is not to be limited by the specific description above. Rather, it should be judged by the claims which follow.

I claim:

1. A mold closure apparatus having first and second mold portions that are positionable with respect to each other so as to form a mold and so as to define a seam between surfaces of the respective mold portions that abut against each other, the improvement comprising:
   a resilient shock absorber linked to one of the mold portions and projecting therefrom such that before the mole portions form the seam, the shock absorber will contact an element linked to the second mold portion; and
   a clamp for causing movement of the mold portions towards each other;
   wherein the shock absorber has a spring that provides resiliency to the shock absorber, and there is an adjusting means operatively connected to the spring to vary a resistance force that the sprig provides against said element when the mold portions are positioned to form the seam.

2. The apparatus of claim 1, wherein there are at least two of said shock absorbers, the two shock absorbers each having such a spring and such an adjusting means, and being arrayed on opposite sides of the mold from each other.

3. The apparatus of claim 2, wherein there are also at least two of said clamps, the two clamps being arrayed on opposite sides of the mold from each other.

* * * * *

UNITED STATES PATENT AND TRADEMARK OFFICE
CERTIFICATE OF CORRECTION

PATENT NO. : 5,306,564
DATED : April 26, 1994
INVENTOR(S) : Gary R. Guzikowski

It is certified that error appears in the above-indentified patent and that said Letters Patent is hereby corrected as shown below:

Column 4, line 19, "mole" should be --mold--

Column 4, line 27, "sprig" should be --spring--

Signed and Sealed this

Second Day of August, 1994

Attest:

BRUCE LEHMAN

*Attesting Officer*     *Commissioner of Patents and Trademarks*